United States Patent
Hardee et al.

(10) Patent No.: US 10,237,699 B2
(45) Date of Patent: Mar. 19, 2019

(54) PREDICTING OBSTACLES IN A TRAVEL PATH

(71) Applicant: International Business Machines Corporation, Armonk, NY (US)

(72) Inventors: Christopher J. Hardee, Raleigh, NC (US); Steven R. Joroff, Tokyo (JP); Pamela A. Nesbitt, Ridgefield, CT (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/428,644

(22) Filed: Feb. 9, 2017

(65) Prior Publication Data

US 2018/0227715 A1   Aug. 9, 2018

(51) Int. Cl.
*H04W 4/029* (2018.01)
*H04W 4/02* (2018.01)

(52) U.S. Cl.
CPC .......... *H04W 4/029* (2018.02); *H04W 4/023* (2013.01)

(58) Field of Classification Search
CPC ..... H04W 4/028; H04W 4/206; H04W 28/26; H04W 4/02; H04W 4/023; H04W 4/026; H04W 4/043; H04W 4/18; H04W 4/029; H04W 4/021; G01C 21/3484; G01C 21/3617
USPC ......... 455/412.1, 412.2, 414.1, 432.3, 456.1, 455/456.2, 456.3, 445, 456.6
See application file for complete search history.

(56) References Cited

U.S. PATENT DOCUMENTS

| | | | |
|---|---|---|---|
| 6,064,926 A | 5/2000 | Sarangapani et al. | |
| 8,073,460 B1* | 12/2011 | Scofield | G06Q 30/02 |
| | | | 455/414.1 |
| 8,548,734 B2 | 10/2013 | Barbeau et al. | |
| 8,600,674 B1* | 12/2013 | Barbeau | H04W 4/028 |
| | | | 340/988 |
| 8,886,256 B2 | 11/2014 | Harada et al. | |
| 9,188,447 B2 | 11/2015 | Rakshit | |
| 9,516,470 B1* | 12/2016 | Scofield | H04W 4/206 |
| 2004/0192341 A1* | 9/2004 | Wang | H04W 28/26 |
| | | | 455/456.1 |
| 2010/0008255 A1* | 1/2010 | Khosravy | G01C 21/20 |
| | | | 370/254 |
| 2010/0070171 A1* | 3/2010 | Barbeau | G01C 21/3617 |
| | | | 701/408 |

(Continued)

*Primary Examiner* — Jean A Gelin
(74) *Attorney, Agent, or Firm* — Cantor Colburn LLP; Kurt Goudy

(57) ABSTRACT

Techniques are provided for performing automated operations in order to predict obstacles to mobile device travel paths. Historical mobile device path data about multiple historical paths previously taken by a plurality of mobile devices during a first period of time is tracked. Recent mobile device path data about a plurality of recent paths taken by multiple mobile devices during a second period of time is received and analyzed, including comparing the historical mobile device path data with the recent mobile device path data. Based at least in part on such analysis, a location is predicted for a new obstacle that is determined to be substantially adjacent to one or more of the recent paths. An indication of the predicted location of the new obstacle is provided to one or more user devices.

18 Claims, 4 Drawing Sheets

(56) References Cited

U.S. PATENT DOCUMENTS

| | | |
|---|---|---|
| 2010/0070334 A1 * | 3/2010 | Monteverde ...... G06F 17/30241 |
| | | 705/14.58 |
| 2011/0153208 A1 | 6/2011 | Kruglick |
| 2014/0274205 A1 | 9/2014 | Goszyk |
| 2015/0070479 A1 | 3/2015 | Yu |
| 2015/0339531 A1 | 11/2015 | Stevens et al. |
| 2015/0339951 A1 | 11/2015 | Stevens et al. |
| 2016/0057726 A1 | 2/2016 | Bai et al. |

* cited by examiner

PREDICTING OBSTACLES IN A TRAVEL PATH

BACKGROUND

The present invention relates in general to prediction of travel obstacles. More specifically, the present invention relates to utilizing location data from mobile devices in order to predict locations of obstacles in a travel path.

Current smartphones, tablets, e-readers, laptops, and other mobile electronic devices (hereafter "mobile devices") allow users to determine their location using Global Positioning System (GPS) or similar location-identifying technology (e.g., GLONASS, WiFi, Bluetooth, etc.). Information about the location of the mobile device may be continuously reported to data collection systems that can analyze and track the paths taken by users over time. Furthermore, computer systems may assemble, analyze, and retain data on the current and previous travel paths of all previous and current users based on such location information.

SUMMARY

According to at least one embodiment, a method for predicting obstacles to mobile device travel paths is provided. The method is implemented by one or more computing systems, and comprises tracking historical mobile device path data about multiple historical paths previously taken by a plurality of mobile devices during a first period of time. The method further comprises receiving recent mobile device path data about a plurality of recent paths taken by multiple mobile devices during a second period of time that is later than the first period of time, and analyzing the recent mobile device path data. Analyzing the recent mobile device path data includes comparing at least some of the historical mobile device path data with at least some of the recent mobile device path data. The method also includes predicting, based at least in part on the analyzing of the recent mobile device path data, a location of a new obstacle that is determined to be substantially adjacent to one or more of the recent paths. The method further comprises providing an indication of the predicted location of the new obstacle to one or more user devices that are each associated with one or more users.

According to another embodiment, a computer program product for predicting obstacles to mobile device travel paths is provided. The computer program product comprises a computer readable storage medium having program instructions embodied therewith. The program instructions are executable by a computing system to cause the computing system to perform a method comprising tracking historical mobile device path data about multiple historical paths previously taken by a plurality of mobile devices during a first period of time. The method further comprises receiving recent mobile device path data about a plurality of recent paths taken by multiple mobile devices during a second period of time that is later than the first period of time, and analyzing the recent mobile device path data. Analyzing the recent mobile device path data includes comparing at least some of the historical mobile device path data with at least some of the recent mobile device path data. The method also includes predicting, based at least in part on the analyzing of the recent mobile device path data, a location of a new obstacle that is determined to be substantially adjacent to one or more of the recent paths. The method further comprises providing an indication of the predicted location of the new obstacle to one or more user devices that are each associated with one or more users.

According to another embodiment, a system for predicting obstacles to mobile device travel paths is provided. The system comprises one or more processors and at least one memory including instructions that, upon execution by a processor, cause the system to perform a method. The method includes tracking historical mobile device path data about multiple historical paths previously taken by a plurality of mobile devices during a first period of time. The method further includes receiving recent mobile device path data about a plurality of recent paths taken by multiple mobile devices during a second period of time that is later than the first period of time, and analyzing the recent mobile device path data. Analyzing the recent mobile device path data includes comparing at least some of the historical mobile device path data with at least some of the recent mobile device path data. The method also includes predicting, based at least in part on the analyzing of the recent mobile device path data, a location of a new obstacle that is determined to be substantially adjacent to one or more of the recent paths. The method further includes providing an indication of the predicted location of the new obstacle to one or more user devices that are each associated with one or more users.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DETAILED DESCRIPTION

Figure 1:
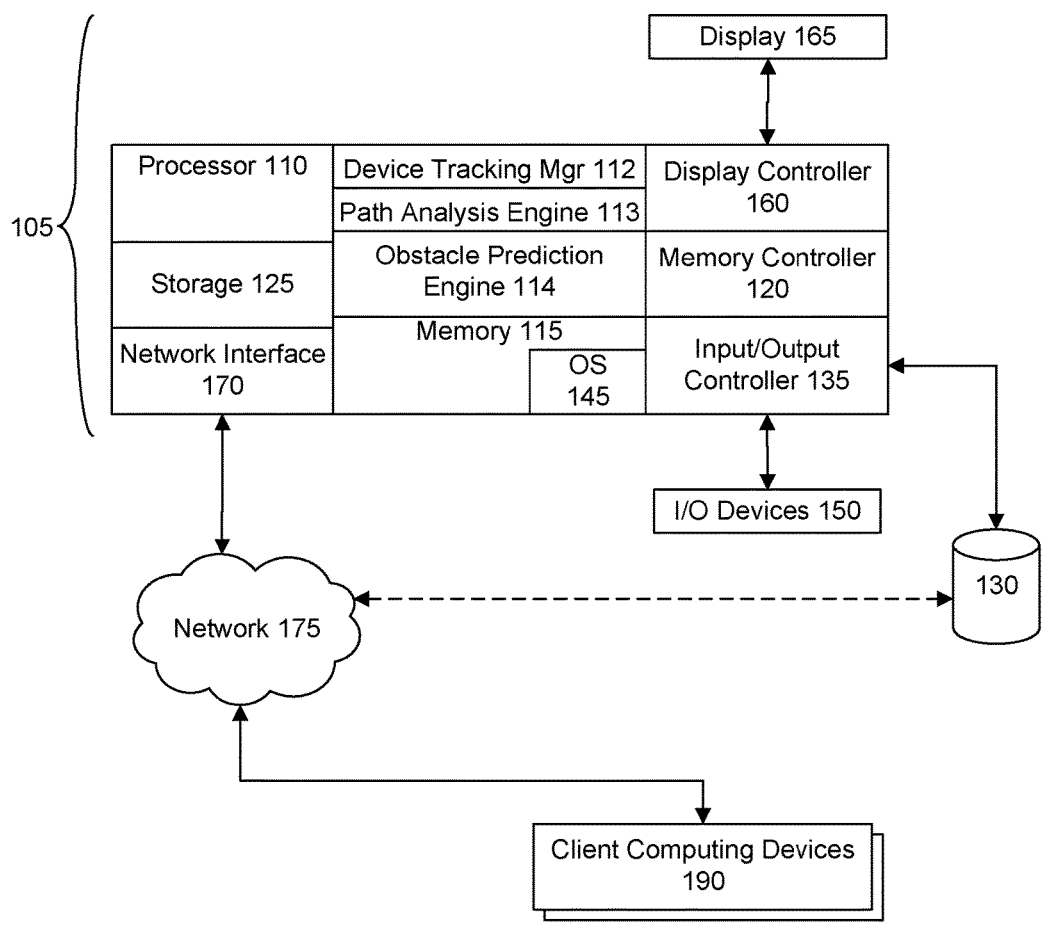
FIG. 1 depicts a block diagram of an exemplary network environment and computing system in accordance with one or more embodiments of the present invention.

One or more embodiments of the present invention described herein enable one or more processor-based computing systems to automatically perform operations to predict obstacles affecting mobile device travel paths. By comparing the historical path data of multiple mobile devices with recent path data of such mobile devices, a processor-based computing system may determine the presence of a potential new obstacle. Once it is determined that a potential new obstacle might exist, a warning may be delivered to mobile devices and their associated users that may encounter the newly determined obstacle in their travel. In certain scenarios, a set of mobile devices that have provided historical travel path data may overlap or even coincide with a set of mobile devices that provide recent travel path data, but such overlap or coinciding is not necessary or even typical. In one or more scenarios and embodiments of the present invention, some or all of the techniques described herein may be performed by an implementation of a Travel Path Obstacle Prediction (TPOP) system.

As used herein, the term "mobile device" refers to any processor-based device that includes the capability to transmit and receive digital information, and further includes one or more capabilities to determine a geographical location of the processor-based device. A non-limiting list of exemplary mobile devices includes portable email devices, personal digital assistants, cellular phones, smart phones, satellite phones, palmtop computing devices, laptop computing systems, tablet computing devices, portable game consoles, media players or other appropriate devices with wireless communications capabilities that includes or combines capabilities of any or all of these. The term "travel path" as used herein refers to any path of travel taken or potentially taken by a mobile device and/or user thereof, including but not limited to a vehicular roadway, pedestrian path or walkway, and other groomed or ungroomed traversable conduit. Similarly, the term "obstacle" as used herein refers to any object, region, or hazard that may interrupt, displace, or otherwise negatively affect movement along a travel path.

In one or more embodiments of the present invention, data from multiple recent travel paths taken by mobile devices may be analyzed by the TPOP system, which may compare such data to other data regarding historical travel paths taken by other mobile devices in order to predict the existence and location of a new obstacle. Once data is tracked over a reasonable period of time, the TPOP system may generate a travel path model or map to determine one or more typical paths taken by such mobile devices.

In one or more embodiments, such a travel path model may be graphically generated; in other embodiments, the TPOP system may generate one or more travel path models as data structures (such as a location array), either internal to or external to the TPOP system. Moreover, in certain embodiments the TPOP system may utilize one or more generated travel path models as an overlay over an existing travel model, such as a two-dimensional or three-dimensional representation of a region known to contain at least a portion of multiple travel paths associated with mobile devices being tracked and/or analyzed by the TPOP system. In one or more embodiments, the TPOP system may utilize elevation data provided by mobile devices in conjunction with two-dimensional location data provided by such devices in order to determine an obstacle relevant to vertical travel (as opposed to planar or topographical travel), such as for aerial vehicles.

In one or more embodiments, the TPOP system may utilize generated travel path models to determine typical paths associated with mobile devices in order to identify the existence of a new area that mobile devices are now avoiding. The new avoided area may be static or dynamic. In at least some embodiments, a dynamic avoided area may be determined by the TPOP system to be a moving hazard. As non-limiting examples, such hazards might include an unsafe vehicle traveling along a similar path as other users; a piece of debris in the road or path; an oil slick or sinkhole in a previously safe travel path; or a dangerous pedestrian or animal occupying an active roadway or path.

Because other users are avoiding this area, a warning can be sent to identified users (such as users associated with mobile devices that are currently traveling on or predicted to travel on travel paths within a predefined proximity of the predicted obstacle) to avoid or be aware of the new potential hazard. In certain embodiments, the TPOP system may advantageously rely only on historical path data and recent path data, and therefore not require that the obstacle be reported, validated with sensors, or otherwise confirmed to exist.

FIG. 1 illustrates a block diagram of a networked computing system 100 for use in practicing the teachings herein. The methods described herein can be performed or otherwise implemented via hardware, software (e.g., firmware), or combination thereof. In an exemplary embodiment, the methods described herein are implemented in hardware, and may be part of the microprocessor of a special or general-purpose digital computer, such as a personal computer, workstation, minicomputer, or mainframe computer. The computing system 100 therefore includes computer 105.

In the illustrated embodiment of FIG. 1, the computer 105 includes a processor 110, a mobile device tracking manager module 112, a path analysis engine 113, an obstacle prediction engine 114, a memory 115 coupled to a memory controller 120, internal storage 125, and one or more input and/or output (I/O) devices 150 that are communicatively coupled to the computer 105 via a local input/output controller 135, which in the illustrated embodiment is further communicatively coupled to external storage 130. The input/output controller 135 may include one or more buses or other wired or wireless connections, as is known in the art. The input/output controller 135 may further include additional elements, which are omitted for simplicity, such as controllers, buffers (caches), drivers, repeaters, and receivers, to facilitate communications. Further, input/output controller 135 may include address, control, and/or data connections to facilitate appropriate communications among the aforementioned components.

Also in the illustrated embodiment, the processor 110 is a hardware device for executing hardware or software instructions, particularly that stored in memory 115. The processor 110 can be any custom made or commercially available processor, a central processing unit (CPU), an auxiliary processor among several processors associated with the general-purpose computer 105, a semiconductor-based microprocessor (in the form of a microchip or chip set), a macroprocessor, or generally any device for executing instructions.

The memory 115 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 115 may incorporate electronic, magnetic, optical, and/or other types of storage media. Note that the memory 115 can have a distributed architecture, where various components are situated remote from one another, but can be accessed by the processor 110.

The instructions in the memory 115 may include one or more separate programs, each of which comprises an ordered listing of executable instructions for implementing logical functions. In the example of FIG. 1, the instructions in the memory 115 include a suitable operating system (OS) 145. The operating system 145 typically controls the execution of other computer programs and may, among other capabilities, provide scheduling, input-output control, file and data management, memory management, and communication control and related services.

In an exemplary embodiment, I/O devices 150 may include, as non-limiting examples, a keyboard, mouse, printer, scanner, microphone, a network interface card (NIC) or modulator/demodulator (for accessing other files, devices, systems, or a network), a radio frequency (RF) or other transceiver, a telephonic interface, a bridge, a router, and other peripherals communicatively coupled to the computer 105 via input/output controller 135. In the depicted embodiment, the computing system 100 further includes a display controller 160 coupled to a display 165, and a network interface 170 communicatively coupled to a network 175. In the depicted embodiment, one or more client computing devices 190 are communicatively coupled to the network 175, such as (but not limited to) client computing devices associated with users who provide mobile device location information in order to receive route guidance and/or other services from the TPOP system.

The network 175 may be an IP-based network for communication between computer 105 and any external server, client and the like via a broadband or other network connection. The network 175 transmits and receives data between the computer 105 and external systems. In an exemplary embodiment, the network 175 may be a managed IP network administered by a service provider. The network 175 may be implemented in a wireless fashion, e.g., using wireless protocols and technologies, such as WiFi, WiMax, etc. The network 175 may also be a packet-switched network such as a local area network, wide area network, metropolitan area network, Internet network, or other similar type of network environment. The network 175 may be a fixed wireless network, a wireless local area network (LAN), a wireless wide area network (WAN), a personal area network (PAN), a virtual private network (VPN), intranet, or other suitable network system and includes equipment for receiving and transmitting signals.

In at least some embodiments, the memory 115 may further include a basic input output system (BIOS) (omitted for simplicity). The BIOS is a set of routines that initialize and test hardware at startup, initiate execution of the OS 145, and support the transfer of data among the hardware devices. The BIOS is typically stored in ROM so that the BIOS may be executed when the computer 105 is activated. When the computer 105 is in operation, the processor 110 is configured to execute instructions stored within the memory 115, to communicate data to and from the memory 115, and to generally control operations of the computer 105 pursuant to the instructions.

Figure 2A:
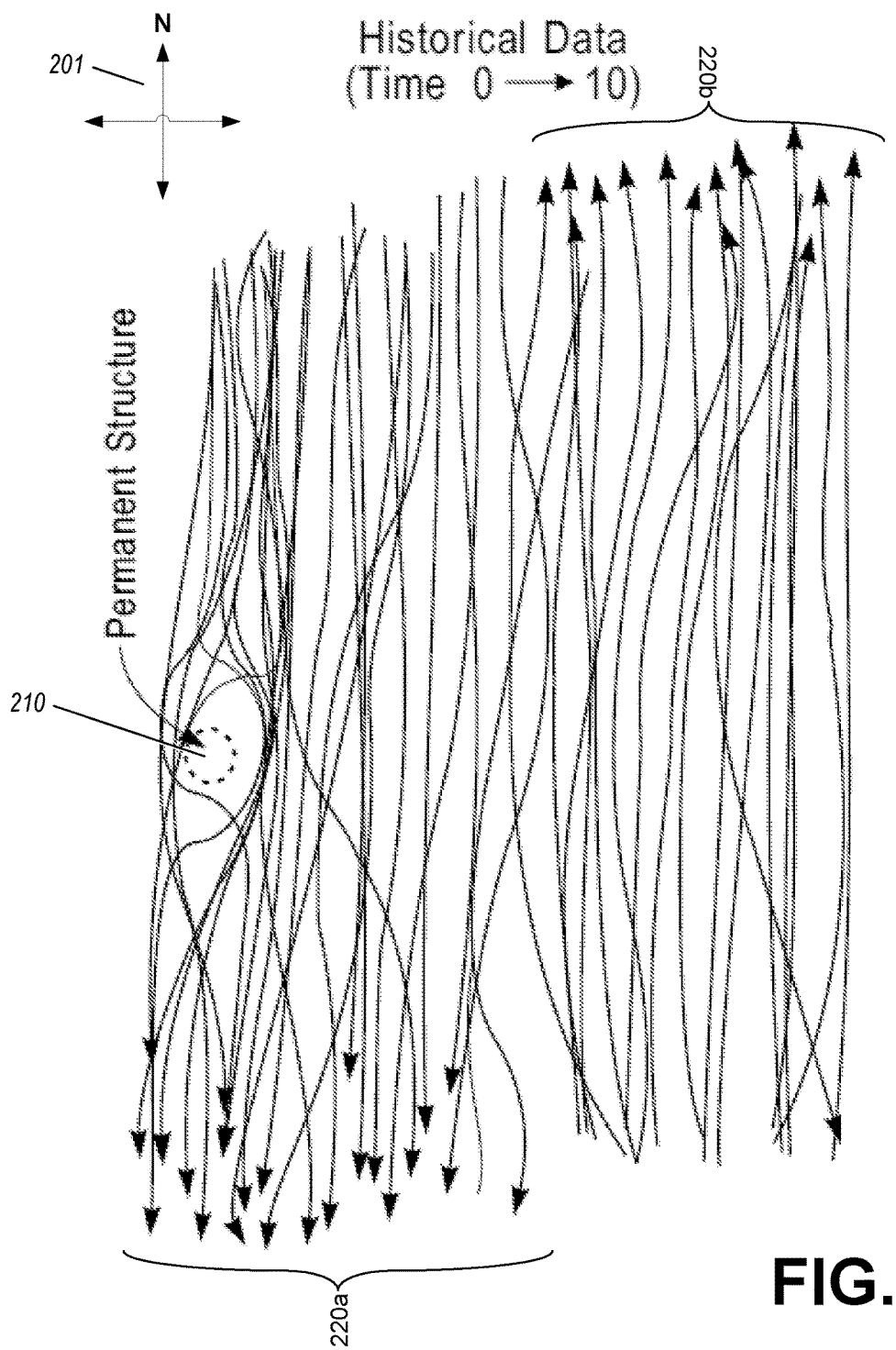
FIG. 2A illustrates an example of historical data about mobile device travel paths being tracked and analyzed in accordance with one or more embodiments of the present invention.

FIG. 2A illustrates an example of historical data about mobile device travel paths being tracked and analyzed by a TPOP system in accordance with one or more embodiments of the present invention. In the embodiment of FIG. 2A, historical mobile device travel path data has been provided by a plurality of mobile devices (not shown) about travel of those mobile devices during a period of time between time indices 0 and 10. The historical mobile device travel path data has been modeled by the TPOP system into a graphical representation, such that each of the historical travel paths 220a and 220b graphically represents the travel of a single mobile device during the time period between time indices 0 and 10. Historical travel paths 220a generally indicate southward movement, as indicated by a directional indicator 201, while historical travel paths 220b generally indicate northward movement. Analysis of historical travel paths 220a indicates that a pre-existing or permanent structure 210 has typically caused mobile devices generally traveling southward along such historical travel paths 220a to diverge around the permanent structure 210, while the historical travel paths 220b are historically unobstructed.

Figure 2B:
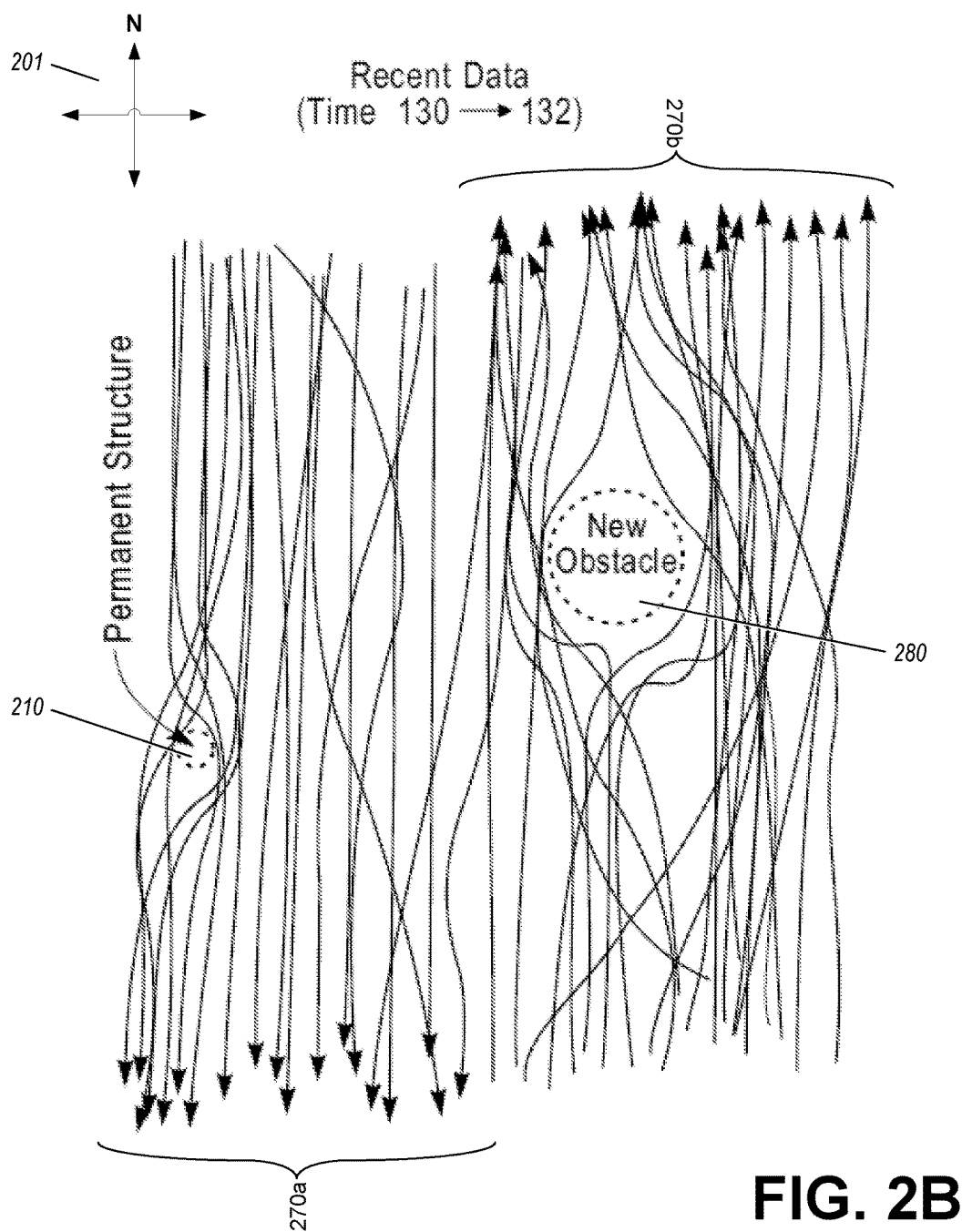
FIG. 2B illustrates an example of recent data about mobile device travel paths being tracked and analyzed in accordance with an embodiment of techniques described herein.

FIG. 2B illustrates an example of recent data about mobile device travel paths being tracked and analyzed by a TPOP system in accordance with an embodiment of techniques described herein. In the embodiment of FIG. 2B, recent mobile device travel path data has been provided by a plurality of mobile devices (not shown) about travel of those mobile devices during a more recent period of time between time indices 130 and 132, such that each of the historical travel paths 220a and 220b graphically represents the travel of a single mobile device during the time period between time indices 130 and 132. In a manner similar to that described above with respect to FIG. 2A, the recent mobile device travel path data has been modeled by the TPOP system into a graphical representation of recent travel paths 270a (generally moving southward) and 270b (generally moving northward), as indicated by a directional indicator 201. During the period of time between time indices 130 and 132, mobile devices generally traveling southward along recent travel paths 270a have diverged around permanent structure 210 as expected, in a manner similarly indicated by the historical mobile device travel path data collected between time indices 0 and 10 and represented in FIG. 2A. However, during the more recent time period between time indices 130 and 132, mobile devices generally moving northward along recent travel paths 270b have diverged around an area 280 that has historically been unimpeded. By analyzing the recent mobile device travel path data, including by comparing recent mobile device travel path data associated with recent travel paths 270b with historical mobile device travel path data associated with historical travel paths 220b (FIG. 2A), the TPOP system predicts that area 280 is likely a location of a new obstacle that is proximate to—and interfering with—recent travel paths 270b. Furthermore, based on its determination of the existence and predicted location of the new obstacle, in certain embodiments, the TPOP system may provide alerts or other notifications to users associated with mobile devices that may currently be traveling along travel paths similar to recent travel paths 270b, or may be likely to travel along such travel paths in the near future (such as mobile devices that typically move along such travel paths at similar times of day, etc.).

Figure 3:
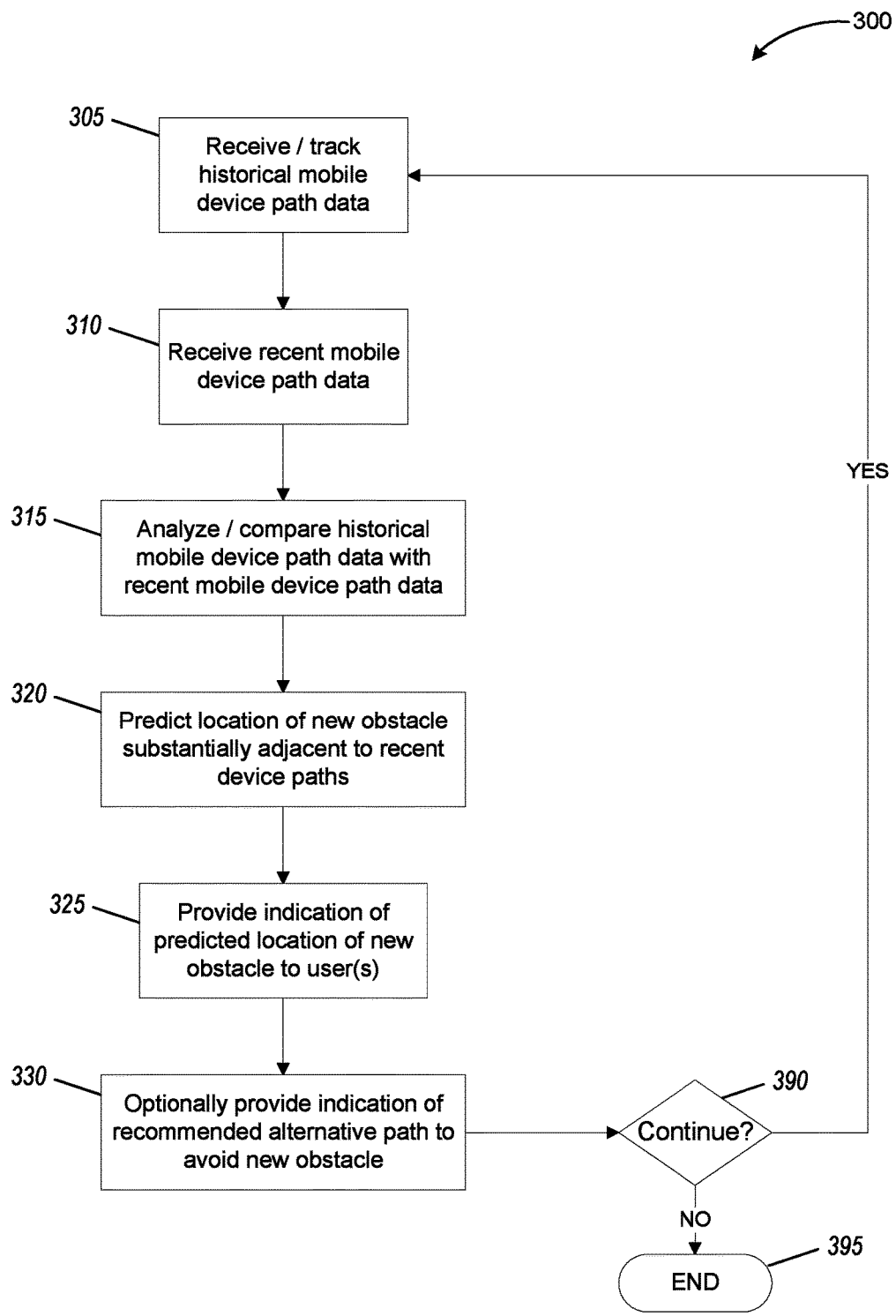
FIG. 3 depicts a process flow for operations by a Travel Path Obstacle Prediction (TPOP) system in accordance with one or more embodiments of the present invention.

FIG. 3 depicts a process flow routine 300 for operations performed by a Travel Path Obstacle Prediction (TPOP) system in accordance with one or more embodiments of the present invention. The routine 300 begins at block 305, in which historical mobile device path data is received and/or tracked by the TPOP system, such as via device tracking manager 112 of FIG. 1. As described elsewhere herein, the historical mobile device path data is indicative of travel occurring during a first period of time.

At block 310, the TPOP system receives recent mobile device path data from multiple mobile devices, such that the recent mobile device path data is indicative of travel occurring during a period of time subsequent to the first period of time. At block 315, the TPOP system analyzes the recent mobile device path data (such as via path analysis engine 113 of FIG. 1), including comparing that recent mobile device path data with the earlier historical mobile device path data.

The routine 300 proceeds to block 320, in which the TPOP system predicts (such as via obstacle prediction engine 114 of FIG. 1) a location of a new obstacle that is substantially adjacent to recent mobile device paths indicated by analysis of the recent mobile device path data.

At block 325, the TPOP system provides an indication of the predicted location of the new obstacle to one or more users. In at least some embodiments, the TPOP system may also identify particular users to which the predicted location should be provided, such as users associated with mobile devices that are currently on or predicted to travel upon a travel path within a predetermined proximity to the predicted location of the new obstacle. At block 330, the routine optionally provides an indication of a recommended alternative path to avoid the new obstacle.

At block 390, the TPOP system determines whether it is to continue, such as in response to receiving an explicit indication to terminate. In the depicted embodiment, if it determines to continue, the TPOP system routine returns to block 305 to await further indications of additional historical mobile device path data provided to the TPOP system. In one or more other embodiments, the TPOP system routine may instead return to block 310 to await further indications of additional recent mobile device path data. If in block 390 the routine determines not to continue, the TPOP system may end operations of the depicted and/or other routines as appropriate, as shown at block 395.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that in some embodiments the functionality provided by the routine or routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that particular data structures discussed above may be structured in different manners, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for predicting obstacles to mobile device travel paths, the method comprising:
   tracking, by one or more computing systems configured to provide a travel path obstacle prediction system, historical mobile device path data about multiple historical paths previously taken by a plurality of mobile devices during a first period of time;
   receiving, by the one or more computing systems, recent mobile device path data about a plurality of recent paths taken by multiple mobile devices during a second period of time that is later than the first period of time; and
   analyzing, by the one or more computing systems, the recent mobile device path data, wherein the analyzing of the recent mobile device path data includes comparing at least some of the historical mobile device path data with at least some of the recent mobile device path data;
   predicting, by the one or more computing systems and based at least in part on the analyzing of the recent mobile device path data, a location of a new obstacle that is determined to be substantially adjacent to one or more of the recent paths;
   providing, by the one or more computing systems, an indication of the predicted location of the new obstacle to one or more user devices that are each associated with one or more users; and
   determining, based at least in part on the analyzing of the recent mobile device path data, that the new obstacle is in motion.

2. The computer-implemented method of claim 1, further comprising identifying, based at least in part on location information provided by the one or more user devices indicating a travel path within a predetermined proximity to the predicted location of the new obstacle, the one or more user devices to which the predicted location of the new obstacle is to be provided.

3. The computer-implemented method of claim 2, wherein providing the indication of the predicted location of the new obstacle includes providing a recommendation to avoid the predicted location of the new obstacle.

4. The computer-implemented method of claim 2, wherein providing the indication of the predicted location of the new obstacle includes providing a recommended alternative travel path that avoids the predicted location of the new obstacle.

5. The computer-implemented method of claim 1, wherein analyzing the recent mobile device path data includes generating one or more travel path models of the recent paths taken during the second period of time in order to determine one or more locations proximate to but avoided by one or more of the recent paths.

6. The computer-implemented method of claim 1, wherein tracking the historical mobile device path data includes generating one or more travel path models of the multiple historical paths taken during the first period of time in order to determine one or more permanent obstacles proximate to one or more of the historical paths.

7. The computer-implemented method of claim 1, wherein elevation data provided by the mobile device is used to determine an obstacle relevant to vertical travel.

8. A computer program product for predicting obstacles to mobile device travel paths, the computer program product comprising a non-transitory computer readable storage medium having program instructions embodied therewith, the program instructions executable by a computing system to cause the computing system to perform a method comprising:
   tracking historical mobile device path data about multiple historical paths previously taken by a plurality of mobile devices during a first period of time;
   receiving recent mobile device path data about a plurality of recent paths taken by multiple mobile devices during a second period of time that is later than the first period of time; and
   analyzing the recent mobile device path data, wherein the analyzing of the recent mobile device path data includes comparing at least some of the historical mobile device path data with at least some of the recent mobile device path data;
   predicting, based at least in part on the analyzing of the recent mobile device path data, a location of a new obstacle that is determined to be substantially adjacent to one or more of the recent paths;

providing an indication of the predicted location of the new obstacle to one or more user devices that are each associated with one or more users; and determining, based at least in part on the analyzing of the recent mobile device path data, that the new obstacle is in motion.

9. The computer program product of claim 8, wherein the method further comprises identifying, based at least in part on location information provided by the one or more user devices indicating a travel path within a predetermined proximity to the predicted location of the new obstacle, the one or more user devices to which the predicted location of the new obstacle is to be provided.

10. The computer-implemented method of claim 9, wherein providing the indication of the predicted location of the new obstacle includes providing a recommendation to avoid the predicted location of the new obstacle.

11. The computer-implemented method of claim 9, wherein providing the indication of the predicted location of the new obstacle includes providing a recommended alternative travel path that avoids the predicted location of the new obstacle.

12. The computer program product of claim 8, wherein analyzing the recent mobile device path data includes generating one or more travel path models of the recent paths taken during the second period of time in order to determine one or more locations proximate to but avoided by one or more of the recent paths.

13. The computer program product of claim 8, wherein tracking the historical mobile device path data includes generating one or more travel path models of the multiple historical paths taken during the first period of time in order to determine one or more permanent obstacles proximate to one or more of the historical paths.

14. A system for predicting obstacles to mobile device travel paths, the system comprising:

one or more processors; and at least one memory, the memory including instructions that, upon execution by at least one of the one or more processors, cause the system to perform a method that includes:

tracking historical mobile device path data about multiple historical paths previously taken by a plurality of mobile devices during a first period of time;

receiving recent mobile device path data about a plurality of recent paths taken by multiple mobile devices during a second period of time that is later than the first period of time; and analyzing the recent mobile device path data, wherein the analyzing of the recent mobile device path data includes comparing at least some of the historical mobile device path data with at least some of the recent mobile device path data;

predicting, based at least in part on the analyzing of the recent mobile device path data, a location of a new obstacle that is determined to be substantially adjacent to one or more of the recent paths;

providing an indication of the predicted location of the new obstacle to one or more user devices that are each associated with one or more users; and determining, based at least in part on the analyzing of the recent mobile device path data, that the new obstacle is in motion.

15. The system of claim 14, wherein the method further comprises identifying, based at least in part on location information provided by the one or more user devices indicating a travel path within a predetermined proximity to the predicted location of the new obstacle, the one or more user devices to which the predicted location of the new obstacle is to be provided.

16. The system of claim 15, wherein providing the indication of the predicted location of the new obstacle includes providing a recommendation to avoid the predicted location of the new obstacle.

17. The system of claim 15, wherein providing the indication of the predicted location of the new obstacle includes providing a recommended alternative travel path that avoids the predicted location of the new obstacle.

18. The system of claim 14, wherein analyzing the recent mobile device path data includes generating one or more travel path models of the recent paths taken during the second period of time in order to determine one or more locations proximate to but avoided by one or more of the recent paths.

* * * * *